June 19, 1951  F. RIEBER  2,557,691
ELECTRONIC FUNCTION GENERATOR
Filed March 19, 1949  3 Sheets-Sheet 1

INVENTOR
FRANK RIEBER, DECEASED
LU GARDA RIEBER, EXECUTRIX
BY
Lippincott + Smith
ATTORNEYS June 19, 1951  F. RIEBER  2,557,691
ELECTRONIC FUNCTION GENERATOR
Filed March 19, 1949  3 Sheets-Sheet 2

INVENTOR.
FRANK RIEBER, DECEASED
LU GARDA RIEBER, EXECUTRIX
BY
Lippincott + Smith
ATTORNEYS June 19, 1951  F. RIEBER  2,557,691
ELECTRONIC FUNCTION GENERATOR
Filed March 19, 1949  3 Sheets—Sheet 3

INVENTOR.
FRANK RIEBER, DECEASED
LU GARDA RIEBER, EXECUTRIX
BY
Lippincott + Smith
ATTORNEYS Patented June 19, 1951

2,557,691

UNITED STATES PATENT OFFICE 2,557,691

ELECTRONIC FUNCTION GENERATOR

Frank Rieber, deceased, late of New York, N. Y., by Lu Garda Rieber, executrix, New York, N. Y., assignor to Geovision Incorporated, a corporation of New York Application March 19, 1949, Serial No. 82,432

12 Claims. (Cl. 315—9)

This invention relates to the generation of electrical waves which are neither linear functions of time (saw-tooth waves) nor sinusoidal, and of applying said waves to modify the deflection patterns employed with cathode ray display tubes. Particularly the invention relates to the production of scanning patterns used in connection with the inventions of this same inventor as covered by the co-pending applications, Serial No. 53,954 filed October 11, 1948, and Serial No. 65,883 filed December 17, 1948.

In accordance with the co-pending applications referred to the cathode ray beam is deflected across the fluorescent screen of a cathode ray tube in patterns which are representative of the loci of strata within the earth which would reflect seismic waves originated at one known location to receptors or geophones at other known locations at successive instants of time following an explosion which originates such seismic waves.

As is shown in the applications mentioned such loci are quasi-circular in form, and they can accordingly be traced by applying to the vertical and horizontal deflecting means of the cathode ray display tube, electrical waves which are proportional to the sine and cosine components, respectively, of a harmonic frequency chosen as the frequency of scanning. This latter frequency may vary quite widely, depending upon whether the loci with respect to specific geophones are traced simultaneously or successively, and upon whether each wave is transmitted in its entirety or whether the outputs of successive geophones are sampled and, if the latter, upon the order of sampling. In any case the master harmonic frequency is amplitude modulated as a function of time, since the reflections received from strata nearer to the shot point and the geophones are received by the latter before those from deeper strata. If the formation to be explored is one wherein the velocity of the seismic waves is a constant the modulating time function will be linear; more frequently, however, the velocity of the waves varies as they pass from stratum to stratum, generally increasing with depth, and in the aforementioned applications there are disclosed function generators which modulate the scanning potentials in the manner required for velocities varying as a linear function of depth. Since the time modulation is applied as a continuous function and not in discrete steps the loci as traced are slightly spiral in form rather than circular, but the scanning rate is so chosen that, so far as this factor alone is concerned, the departure from circularity is not material or observable.

If the ray paths across the face of the display tube are to be truly representative of the loci, however, there are other corrections which must be applied to the harmonic deflecting potentials. The most important of these corrections is the elliptical correction; it can be shown that, assuming constant velocity of the waves, the locus of the reflecting surface at any instant is an ellipsoid of revolution having as its foci the shot point and the receptor with respect to which the locus is described. The major radius of such an ellipsoid is directly proportional to time and is equal to $t$, the elapsed time after the instant of the explosion, times one-half of the velocity of the seismic wave. This radius can be considered that of the radius of the sphere circumscribed about the ellipsoid. The minor radius is that of the inscribed sphere.

Generally the circular trace which would be described on the face of the cathode ray tube were sine and cosine components of equal amplitude applied to the deflecting means can best be modified by applying a correction to the sine component, and it can be shown that under the conditions mentioned this correction is equal to $$-R\left[1-\sqrt{1-\left(\frac{t_0}{t}\right)^2}\right]$$

where $t_0$ is the time required for the wave to traverse the distance between the shot point and the individual receptor by the most direct route and $R$ is the major radius. It will be noted that this quantity is a rapidly decreasing non-linear function of time, and one which it is difficult to generate by ordinary electrical computing circuits.

The correction factor introduced owing to variable velocity has already been mentioned. The particular formula illustrated in the co-pending applications is an arbitrary one which will certainly be departed from locally in any actual geological location, and, even considered in general, may be far from that which will be found by actual experiment.

In view of the facts above set forth it is an object of this invention to provide a means of generating non-linear functions of time and of time and other variables; to provide a means of generating arbitrary functions which may, if desired, be discontinuous; to provide a means of generating scanning potentials which are proportional to the velocity integrated with respect to time, the velocity varying either continuously or in discrete steps; to provide a means of applying elliptical corrections to circular sweep voltages for cathode ray tubes; and to provide means and methods whereby an analyst of geophysical data may, in effect, duplicate upon a cathode ray display screen the conditions of velocity and wave front form obtaining in a geological mass to be analyzed.

Considered broadly this invention contemplates the use, in conjunction with a cathode ray display tube, of an auxiliary cathode ray tube having a fluorescent, preferably instantaneously responsive screen. A photoelectric cell is positioned for illumination by the fluorescent light from this screen, and a shield of light intercepting material is interposed between the screen and the photoelectric cell. The shield may either be of opaque material apertured in accordance with a predetermined formula, such as that for the elliptical correction or the variable velocity correction, or it may be of light permeable material having a variable opacity so as to intercept different amounts of light from different portions of the screen so that the illumination reaching the photocell varies, as the cathode ray sweeps across the screen, in accordance with the basic time function. The output of the photoelectric cell, usually amplified, is applied to modulate either one or both of the deflecting waves as applied to the display tube, and, in certain circumstances, can also be applied to modulate the deflecting waves of the auxiliary tube itself.

The nature of the invention will be more readily understood from the ensuing detailed description taken in connection with the accompanying drawings, wherein.

In the descriptions which follow it will be understood that only those elements are covered which relate directly to the present invention, and that in combining it with equipment as it would be actually used there may be necessary additional amplifiers, buffers, switching mechanism, and the like. Such elements are either shown in the co-pending applications previously referred to or are well known to those skilled in the art and they are omitted because their inclusion here would obscure the specification rather than make it clearer.

Figures 1, 4:
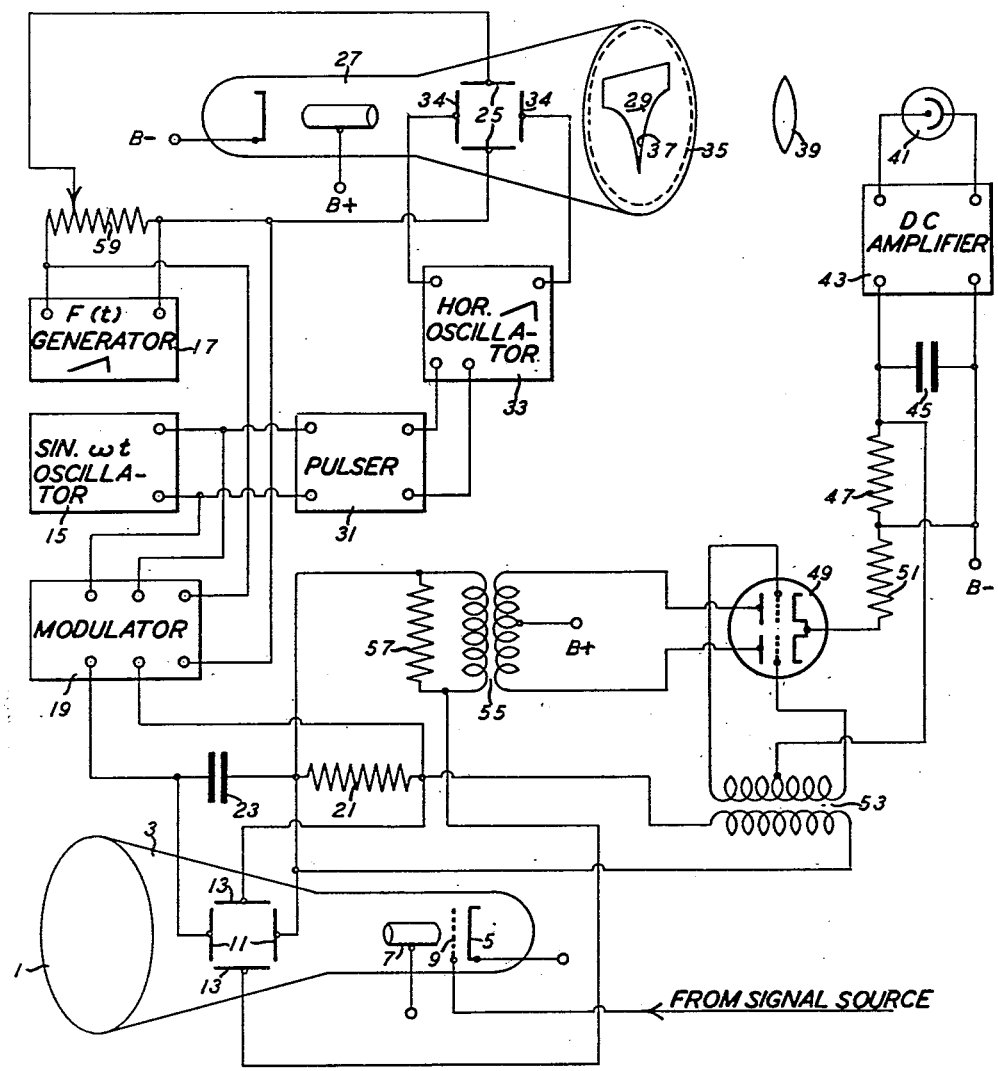
Fig. 1 is a simplified circuit diagram, largely in block form, of the invention as used in generating the elliptical correction potentials for use with a display tube of the electric deflection type.
Fig. 4 is a detailed view of one of the adjusting members employed in Fig. 3.

The drawing in Fig. 1 illustrates the essentials of the invention as employed and shown (but not claimed) in co-pending application serial No. 65,883 referred to above. The equipment illustrated is that used to apply the elliptical correction to quasi-circular loci as developed upon the fluorescent screen 1 of a display cathode ray tube 3. This tube is of a well known type, having a cathode 5, an accelerating anode 7 and a grid 9 for modulating the intensity of the cathode rays. It may also, if desired, be provided with an additional anode or anodes. The source of the signals used to modulate the cathode ray beam is not shown, as not pertinent to the present invention.

Although electro-magnetic means may be used for deflecting the cathode ray beam of the tubes utilized in this invention it is almost always more convenient to use electric deflection and the display tube is therefore shown as provided with horizontal deflecting plates 11 and vertical deflecting plates 13, to which the deflecting potentials are applied.

The primary source of the deflecting potentials is a sine wave oscillator 15. This oscillator preferably operates at a frequency of several thousand cycles per second, but the actual frequency used will depend upon the rate at which it is desired to accomplish the complete scanning cycle. The latter is determined by the F (t) generator 17. The screen 1 is scanned completely in each cycle of the F (t) generator, and the frequency of the oscillator 15 should be high enough to accomplish many complete cycles in each cycle of the generator 17. Usually the output of the latter will be a saw-tooth potential wave, so that during the greater portion of each cycle its output voltage is a linear function of time. It is to be noted, however, that this is not necessarily the case, as it may be desirable to apply the elliptical correction to a wave front already modified by the velocity function, for example.

The output of generator 17 is fed to a modulator 19 which modulates it upon the output of oscillator 15 as a carrier. The modulator is adjusted to give one hundred per cent modulation, so that the amplitude of the modulated wave varies during the cycle of generator 17 from zero to the desired maximum. The output of modulator 19 is fed to a phase splitting network, here shown as comprising a resistor 21 in series with a condenser 23, but other types of phase splitters or resolvers can be used. The constants of the resistor and condenser are so chosen as to have equal impedance at the frequency of oscillator 15, and therefore to apply equal potentials to the vertical and horizontal deflection plates 11 and 13 respectively, connected across them. If the deflection sensitivity of the tube is not the same in the two directions suitable modifications of the constants of the resistor and condenser would, of course, be made, so as to give a circular deflection pattern when supplied with the unmodulated wave from oscillator 15, and a "tight spiral" deflection pattern of nearly circular turns when the wave is modulated as shown.

The cosine phase component from the modulator, as developed across the condenser 23, is applied directly to the horizontal deflection plates 13, since it is here assumed that the elliptical correction is to be applied to the vertical deflection component only. The high potential end of the resistor 21 is connected to one of the vertical deflection plates 11. The elliptical correction is applied to the other plate 11, in series with the drop across resistor 21. The development of this correction potential will next be described.

The timing wave from generator 17 is also applied to one pair of deflection plates 25 of an auxiliary cathode ray tube 27. This tube is also of conventional type, but it may differ from tube 3 in that there is no necessity for a control grid. It is important, however, that its screen 29 be of the instantaneous type, fluorescent without afterglow and not phosphorescent.

The horizontal deflection of the beam in the tube 27 is controlled by the oscillator 15, a portion of whose output is fed to a pulser 31 and synchronizes a saw-tooth oscillator 33 connected to the other pair of deflection plates 34. Such synchronization is not strictly necessary, particularly if the horizontal oscillator be designed to operate at a higher frequency than oscillator 15. For some purposes, however, synchronization is desirable and it is therefore shown here.

Mounted in front of the fluorescent screen 29 is a shield or diaphragm 35, provided with an aperture 37 the shape of which is mathematically computed in accordance with the correction to be applied to the scanning potentials applied to the tube 3. This will be considered in detail hereinafter. The light from the screen 29, as modified by the apertured diaphragm 35, is gathered by an optical system indicated schematically by the lens 39 and focused on the cathode of a photoelectric cell 41.

The photocell feeds a D. C. amplifier 43, the output circuit of which includes an integrating circuit comprising a condenser 45 and a resistor 47 in parallel therewith. This circuit should have a relatively short time constant, equal, perhaps, to two or three cycles of the oscillator 33 but short in comparison with the period of the time function generator 17. The potential developed across the resistor 47 will, under these circumstances, be proportional to the width of the aperture 37 at the position momentarily being scanned. This potential is used to remodulate the cosine phase component of the output of modulator 19.

The modulator used for this purpose is but one of many forms which might be used. It comprises a double triode 49, biased substantially to cut-off by the drop through a cathode resistor 51 connected in series with resistor 47. Additional bias may, of course, be used if necessary. The time modulated sine component of the scanning frequency is applied in push-pull to the two grids of tube 49 through a transformer 53, the primary of which is connected across resistor 21, the secondary connecting to the two grids. The secondary is center tapped, with the tap connected back to resistor 47. The potential across this resistor is therefore applied equally to both grids, and is so phased as to raise them above cut-off in proportion to the width of the aperture 37 instantaneously being scanned.

The plates of the tube 49 are connected in push-pull to the primary of an output transformer 55, the secondary of which is connected across a resistor 57. One end of the latter resistor is connected to the junction between resistor 21 and condenser 23, and the other is connected to the second of the vertical deflection plates 13. The total potential applied across these plates is therefore equal to the sum of the drops across resistor 21 and resistor 57 in such phase as to oppose each other, the correction always being subtractive.

The nature of correction to be applied has already been briefly discussed. In greater detail, the purpose of the correction is to give the vertical deflection of the ray in the display tube the same ratio to the horizontal deflection as the minor radius of the ellipsoidal locus has to its major radius at a given instant. It can be shown that the equation of this relationship is $$R_2 = R_1 \sqrt{1 - \left(\frac{t_0}{t}\right)^2}$$

where $R_2$ is the minor axis, $R_1$ the major axis, and $t_0$ the time required for the seismic wave to travel the direct distance between the shot point and the geophone under consideration. The correction to be applied is equal to $$R_2 - R_1 = -R_1 \left[1 - \sqrt{1 - \left(\frac{t_0}{t}\right)^2}\right]$$

Up to the point where $t = t_0$ the quantity under the radical is imaginary; there is no ellipse with such a minor radius. During this interval therefore the correction may be made equal to $R_1$.

Figure 2:
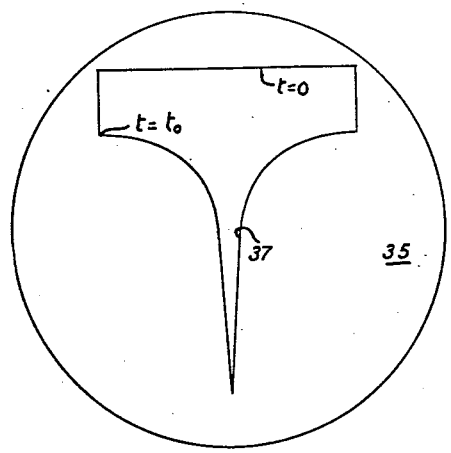
Fig. 2 is a front view of a shield or diaphragm apertured to apply the elliptical correction.

The shield or mask 35 is shaped to give this correction. The shape of the aperture to accomplish this is shown in Fig. 2. The potential applied from the generator 17 to the vertical deflecting plates of tube 27 is adjusted, as by the potentiometer 59, to such value as will move the beam from the top of the aperture, marked $t=0$ in Fig. 2, down to the point marked $t=t_0$ in a fraction of the cycle of the generator 17 proportional to this latter period of time. The gain of the amplifier 43 is so adjusted that during this interval the drops across resistor 21 and resistor 57 are equal. From this time on, as the voltage developed by the modulator 19 increases, the proportion thereof generated across resistor 57 progressively decreases, and the family of ellipses developed on the screen 1 of tube 3 properly represents the loci desired.

The aperture as shown in Fig. 2 is designed to define the area under the curve $$1 - \sqrt{1 - \left(\frac{t_0}{t}\right)^2}$$

taking $$\left(\frac{t_0}{t}\right)^2$$

equal to unity when greater than one. Actually the curve shown is that given plus its mirror image, but this is immaterial as long as the width is in the proper proportion. Since the horizontal deflection is linear, and since the brilliancy of the spot on the fluorescent screen is a constant, the light reaching the photocell, integrated over each cycle of the horizontal deflecting frequency, is proportional to the required correction.

The use of a saw-tooth horizontal scan makes the relationship between the width of the aperture and the magnitude of the correction to be applied easily evident, but it is not necessary that a linear scan be used. The pulser and horizontal oscillator may be omitted and the sine wave from oscillator 15 used directly if the shape of the aperture 37 be modified to take account of the varying rate of travel of the sine-deflected wave across the face of the fluorescent screen 37. In this case the amplitude of the horizontal deflection should be made accurately equal to the width of the aperture at its widest point, and the width of the aperture itself, at any ordinate $t$, should be proportional to sin 90.

$$\left[1 - \sqrt{1 - \left(\frac{t_0}{t}\right)^2}\right]^0$$

instead of to $$1 - \sqrt{1 - \left(\frac{t_0}{t}\right)^2}$$

The shape of the aperture as thus modified differs slightly from the shape of the aperture shown in Fig. 2, but the difference is not sufficient to be apparent without careful comparison of the two and the modified diaphragm is therefore not shown.

Figure 3:
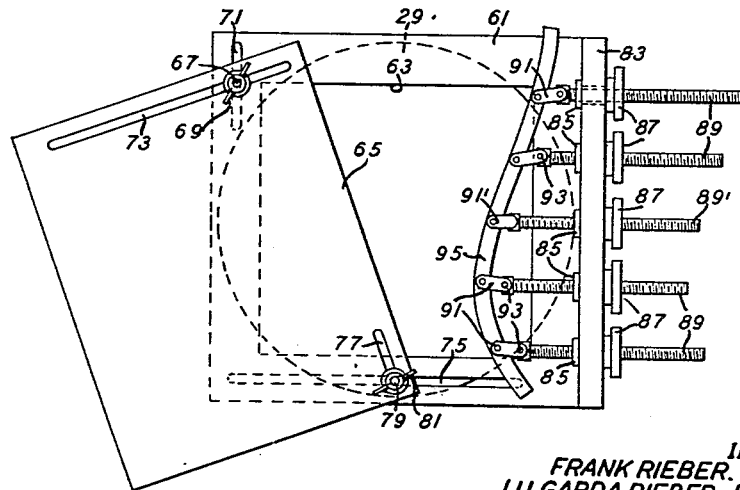
Fig. 3 is a front elevation of a shield adjustable to generate an arbitrary time function.

The form of the invention shown in Figs. 1 and 2, with a diaphragm of a fixed aperture, is entirely satisfactory where the potentials to be applied conform to a fixed and invariable formula, as in the case of the elliptical correction. There are cases, however, where it is desirable to apply a correction of an arbitrary or empirical type, and in this case an adjustable shield may be used. One form of such shield is illustrated in Fig. 3. In this case the fluorescent screen 29 is indicated as being positioned behind a metal plate 61 framing a rectangular aperture 63. One side of this aperture may be shielded in part by a second plate 65. Means are provided for tilting the latter plate with respect to the aperture 63 so as to take account of any systematic widening or narrowing of the aperture from top to bottom that may be required by the empirical correction to be applied. This tilting adjustment may be accomplished by means of a bolt and wing nut 67 and 69, the bolt passing through a vertical slot 71 in the plate 61 and a horizontal slot 73 in the plate 65. Similarly, in the lower edges of the plates, are a horizontal slot 75 in the plate 61 and a vertical slot 77 in the plate 65, through which passes another bolt 79 secured by a wing nut 81. By this arrangement the plate 65 may be tilted as required, as shown in the figure.

Minor variations in the scanning aperture width are taken care of by an adjustment provided on the right hand side of the plate 61, as shown in Fig. 3. A vertical flange 83 projects outwardly from the plate 61, secured firmly to its edge. Holes are formed at regular intervals along the flange 83, and through these holes pass freely rotatable internally threaded bushings 85, which may be turned by adjusting wheels or knobs 87. Adjusting rods 89 are threaded through the bushings 85, so that the degree to which they project through the flange 83 toward the aperture 63 can be adjusted by turning the bushings.

Each of the rods 89 carries on its end a yoke 91, this yoke being pivotally mounted on the end of the adjustment rod by a hinge joint 93 as shown in Fig. 4, with one exception; the central rod, 89', has its yoke 91' rigidly attached so that it is not capable of any lateral movement. The yokes carry a flexible margin plate 95, which may consist of a fairly heavy strap 97 of semi-soft rubber cemented to a thin spring steel base plate 99, as shown in cross section in Fig. 4. Pins 101 passing through the yoke 91 and vertical holes in the rubber strap 97 secure the margin strip to the adjusting rods 89. By manipulation of the adjusting wheels 87 the margin strip can be given any curve desired. If necessary, of course, more of the adjusting rods may be used so as to develop more complex curves if this is necessary.

The margin strip is given a considerable width, as shown, in order that it may shield the portion of the aperture 63 lying to its right from the optical system or lens 39. Such an arrangement can be achieved with almost any curve desired, but in case it cannot be auxiliary shielding means can be used over the unscreened portion of the aperture.

One of the most useful applications for this invention is for developing scanning wave potentials which will take account of the variations of velocity of seismic waves at various depths within the earth. Since the device is capable of generating any arbitrary function of time it is admirably adapted to this purpose, and diaphragms may be cut or adjusted to take account of any such variations.

Figure 5:
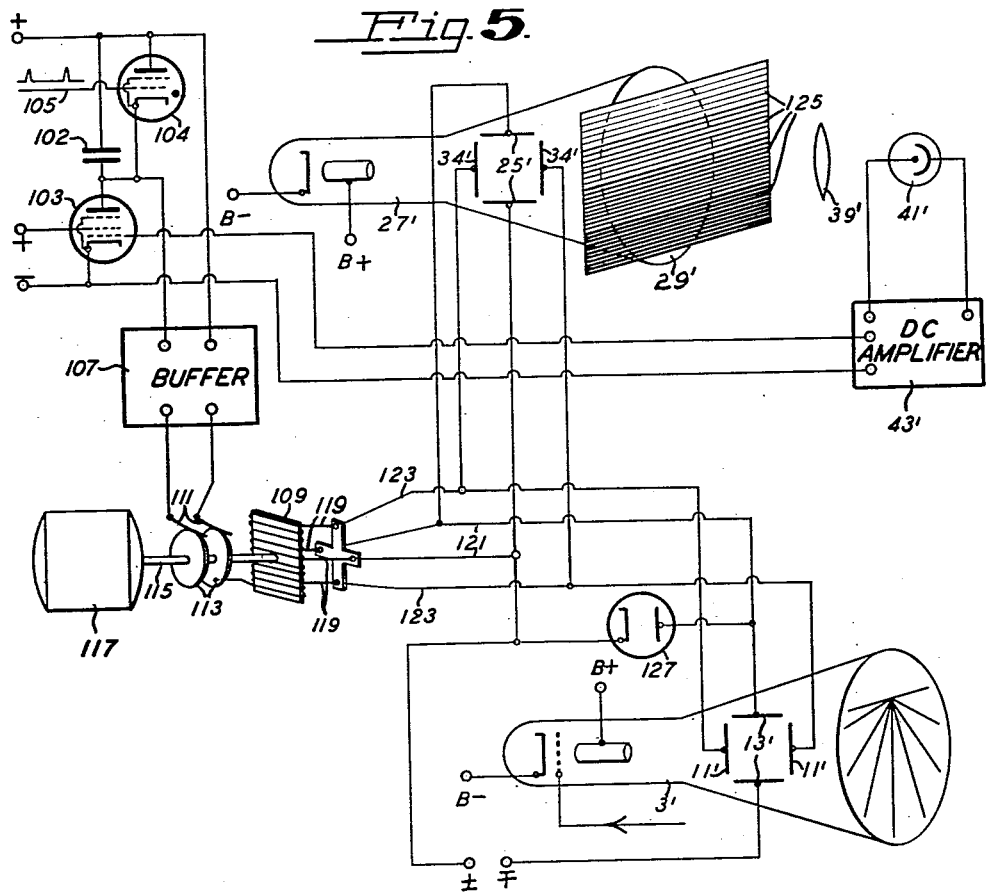
Fig. 5 is a circuit diagram of the invention as modified to apply radial scanning potentials corresponding to seismic wave velocities varying in discrete steps from stratum to stratum.

The forms of this invention which have been described thus far modulate the light emitted from the fluorescent screen of the auxiliary tube by cutting it off completely during a portion of each lateral scanning. It is also possible to modulate the light continuously, so that it is unnecessary to integrate over the scanning cycle, by using semi-transparent (or semi-opaque) shields whose opacity varies in a systematic manner over the face of the tube. This is a particularly valuable feature since it offers a means of applying the velocity correction stratum by stratum instead of in accordance with an assumed general law of increase of velocity with depth. Fig. 5 illustrates one method of accomplishing such modulations.

Before considering Fig. 5 in detail, it should be brought out that the quasi-circular loci of the reflecting surfaces which are being considered may be generated in two quite different scanning patterns. The matter thus far discussed consists in tracing the loci circumferentially, but it is also possible to scan radially. The latter procedure introduces complications if the seismic waves are to be picked up directly from the geophones. It is quite simple, however, if the waves be phonographically recorded and played back repeatedly into the analyzing equipment, as the inventor has shown in the prior applications mentioned above.

The scanning pattern will depend, in the latter case, upon the relative frequencies employed for the generation of the time axis, and those used to represent the harmonic components sine $\omega t$ and cosine $\omega t$. If $\omega$ be large, so that very many cycles of the harmonic frequencies are accomplished in each cycle of the time base, the scanning pattern will be circumferential, but of $\omega$ be made small, so that many time base scansions are accomplished for each cycle of the harmonic frequency, the scanning will be practically radial. In either case there is a slight distortion; the quasi-circular scansion is actually spiral, while the "radii" are actually very slightly curved. The amount of these distortions can, however, be made very small, and in either case the bright traces on the screen of the display tube will have substantially the same general shape and if the scanning is rapid enough it will be nearly impossible to detect which of the two systems of scanning is used, although in one instance that bright loci are traced continuously while in the other they are formed of a series of bright dots on closely adjacent radii. Furthermore, since modulation is the process of multiplying two quantities, it is only by custom that it is considered that one of the modulating frequencies is the "carrier" and the other the "modulating" frequency. It therefore makes no theoretical difference whether a saw-tooth time base be used to modulate a harmonic wave of much higher frequency, or whether a harmonic wave be used to modulate a higher frequency saw-tooth time base. In the form of the invention heretofore described the former system was used, but in the modification shown in Fig. 5 the latter system is employed.

In this embodiment a modified saw-tooth generator is used, comprising a condenser 102 which is charged from a constant frequency source through a sharp cut-off pentode 103, the screen grid of the pentode being held at a constant potential with respect to the cathode so that current passed by the tube is substantially independent of plate potential and depends practically entirely on that of the grid.

A grid-glow tube 104 connects across the condenser, and discharges it at regular intervals determined by pulses supplied through lead 105 to the control electrode of the tube, and synchronized with the repetition frequency at which the recorded waves are played back into the equipment. The timing pulse frequency may be several hundred per second if the scanning cycle is a few seconds, or proportionally higher for shorter scanning cycles. The rate at which the condenser 102 charges is determined by the potential applied to the control grid of tube 103, as developed by the photoelectric cell 41' and amplifier 43' from the output of the auxiliary cathode ray tube 27'.

In order to avoid distorting the wave form across the condenser by loading, a buffer 107, of high input impedance, such as a cathode follower, is connected across it. The output of the buffer 107 is fed to a rotating potentiometer card 109 through brushes 111 and slip rings 113. The potentiometer card and its slip rings are rotated by the shaft 115 of a motor 117 which, directly or through gears, makes one revolution within the major scanning period. Potentiometer contacts 119 take off sine and cosine components of the voltage developed across the potentiometer. The pair of leads 121 connects the sine component brushes to the vertical deflection plates 25' of tube 27' and 13' of tube 3'. Similarly a second pair of leads 123 connects to the horizontal deflecting plates 11' and 34'.

Since the angular position of the potentiometer card does not change materially during the charging time of condenser 102, the cathode rays are therefore deflected substantially radially across the screens of both tubes.

The rate at which the rays are deflected depends upon the rate of charge of the condenser, and the amplitude of the deflection at any instant depends upon the potential it has acquired, which is the integral of the rate. The rate of charge is therefore a true analog of wave velocity, and potential an analog of distance traveled by the wave front.

To follow through with the analogy the shield used to modulate the light reaching the photocell from screen 29' is of graduated opacity instead of a diaphragm with a graduated width aperture. Depending on the sensing of the amplifier 43' with respect to the grid of tube 103, either the transparency or the opacity of the shield may be made proportional to the velocity of propagation of the waves. As a matter of convenience it is preferred to make opacity proportional to velocity.

In this case the amplifier 43' is adjusted so that in portions of the screen 29' where minimum light is absorbed the rate of deflection of the beams, as determined by the potential applied to tube 103, is proportional to the minimum velocity of the seismic waves; i. e., to their velocity in the surface layers. Increase in opacity of the screen swings the grid of tube 103 toward the positive, increasing the rate of charge of the condenser. Strips of material 125, of various opacities corresponding to the velocity in successive strata, may then be applied as the shield.

It is to be noted that the term "opacity" is used here, rather than the term "density," since the latter is defined as a logarithmic function, and "opacity" as here used means a linear function; a strip with an opacity of two passes one-half the light of a strip with an opacity of one. The opacity of the various strips is made proportional to the velocity of the waves in the strata considered. Taken collectively the strips therefore form a stepped optical wedge.

In practice, it is preferable to make a first analysis of a terrain to be explored using a wedge the opacity of which increases continuously in accordance with an assumed law, such as a uniform increase of velocity with depth. An initial analysis is made on this basis, and the location of various strata determined approximately. Once this determination is made strips of the correct opacity, as determined from reflection coefficients and other assumed or known data, can be applied by successive approximations. By such cut-and-try methods a very accurate mapping of the area under exploration may be achieved.

It should be noted that if the strata were all horizontal it would be unnecessary to apply the horizontal deflection to the auxiliary tube, but as, in general, the strata will have a dip, strips 125 can be given a similar dip in the plane of projection and the result will be the proper application of the correction factors. A very great advantage of this system is that it permits decreases of velocity with depth as well as increases. The scanning ray on both tubes increases in its velocity of scanning as soon as it starts to traverse an area on the auxiliary tube of greater opacity.

A diode 127 can be bridged across the vertical deflecting plates to suppress upward deflections above the "ground line."

Figure 6:
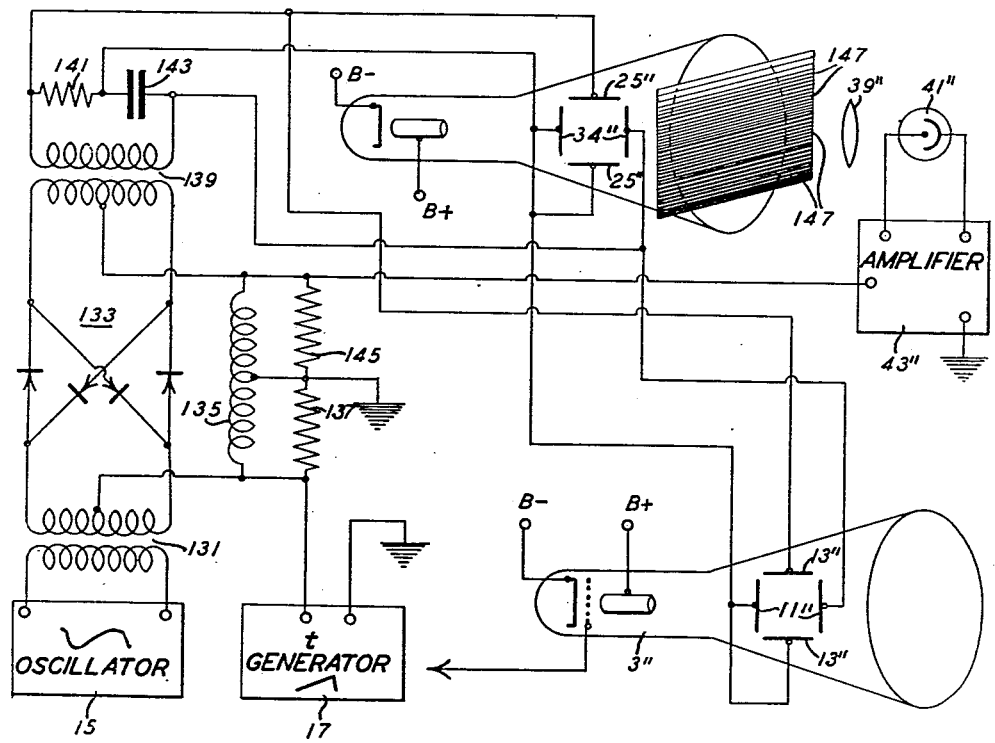
Fig. 6 is a similar diagram of the invention as used to apply correcting potentials to circular sweeps, again corresponding to velocities varying in discrete steps between strata.

Fig. 6 shows the further modification required to apply the same principles as shown in Fig. 5 to circular scanning. In this case the time base generator 17 operates at the lower frequency and the sine wave oscillator 15 at the higher one, these oscillators being essentially the same as those shown in Fig. 1, and hence carrying the same reference characters. The oscillator 15 supplies the "carrier" current, through a transformer 131 to a ring modulator 133. The modulator is fed with a portion of its modulating potential through an autotransformer winding 135, one-half of which is connected across a resistor 137 connected across the output of the generator 17.

A transformer 139 connected across the output of the ring modulator feeds a phase splitter comprising a resistor 141 and condenser 143. The vertical deflecting plates 13" and 25" of the display and auxiliary cathode ray tubes respectively are connected across resistor 141 and the horizontal deflecting plates 11" and 34" respectively across the condenser 143 to apply the sine and cosine components of the deflecting potential. The output of the photocell 41", and amplifier 43", feed an output resistor 145 connected across the other half of the autotransformer winding 135.

It will be seen that this connection applies the correction developed by the photocell additively instead of factorially as in the preceding case.

In this form of a device the strips 147 which comprise the shield are themselves optical wedges, the opacity gradients of which are proportional to the increments of velocity in the various strata.

traversed over the base velocity of the waves in the surface layer. The adjustment of the amplifier 43' is such that no voltage is developed across resistor 145 with full illumination of the photocell. Motion of the ray of the auxiliary tube across the strip representing a stratum in the direction of its opacity gradient develops more and more voltage across resistor 145, expanding the radius proportionally. As each strip is itself an optical wedge which represents an increment in velocity and not a velocity per se, they can be overlapped instead of each being cut to width, except in the case where a velocity decreases, in which case the gradient will also decrease.

The modification of Fig. 6 has many of the advantages of that of Fig. 5. The optical wedges representative of varying increments in velocity are somewhat more difficult to prepare than the strips of constant opacity required for the radial method of scansion, but they may be made with sufficient accuracy for all practical purposes by photographic methods, withdrawing a shutter or plate slide at a uniform rate to make a negative and using a positive transparency made from such a negative as the wedge, being careful to hold the "gamma" of development at a value of unity.

It will be noted that the slope of the wave from generator 17 represents the initial velocity of the waves while the gradients of the optical wedges 147 represent velocity increments which are converted by the photocell into potential gradients with respect to time. The combined potentials at any instant are therefore proportional to the integrals of the average velocities up to that instant.

Well logging operations give average velocities at various depths. Therefore an obvious expedient where logging data are available is to construct a single optical wedge the opacity (or transparency) whereof at any ordinate is proportional to the integral with respect to time of the average velocity down to the corresponding depth. The initial velocity here becomes the constant of integration.

One of the major advantages of the invention here set forth is its flexibility, and the examples described in detail are illustrative of only a few of the uses to which it may be put. These descriptions therefore are not to be considered as limiting, but protection is desired as broadly as is possible within the scope of the following claims.

What is claimed is:

1. Cathode ray display apparatus comprising a cathode ray display tube and an auxiliary cathode ray tube each having a fluorescent screen and means for deflecting the cathode rays generated therein over said screen, generators of electric waves for deflecting said cathode rays in two dimensions, a photoelectric cell illuminated by fluorescent light from the screen of said auxiliary tube, a light-intercepting shield interposed between said photoelectric cell and said auxiliary tube screen, a modulator of electric waves from at least one of said generators by the output of said photoelectric cell, and circuits for applying the modulated waves to the deflecting means of said display tube.

2. Apparatus in accordance with claim 1 including circuits for applying said modulated waves to the deflecting means of both of said cathode ray tubes.

3. Apparatus in accordance with claim 1 wherein said shield comprises a diaphragm apertured in accordance with a predetermined geometrical figure.

4. Apparatus in accordance with claim 1 wherein said shield comprises a diaphragm having an aperture at least one margin of which is adjustable to an arbitrary curve.

5. Apparatus in accordance with claim 1 wherein said shield comprises light permeable material of varying degrees of opacity distributed thereover in accordance with a predetermined geometrical pattern.

6. A scanning system for the display of geophysical data comprising a cathode ray display tube and an auxiliary cathode ray tube each provided with a fluorescent screen and means for deflecting a cathode ray over said screen in two dimensions, means for generating electrical waves in accordance with the functions $A=Kt \sin \omega t$ and $A=Kt \cos \omega t$, where A is the instantaneous amplitude of said waves, K is a numerical coefficient of proportionality, $t$ is time within a limited interval and $\omega$ is an angular velocity; circuits for applying said waves respectively to the deflecting means of said auxiliary tube, a photoelectric cell illuminated by fluorescent light from said auxiliary tube, a light-intercepting shield interposed between said photoelectric cell and said illuminating screen, means for modulating said electrical waves in accordance with the current passed by said photoelectric cell, and circuits for applying said modulated waves respectively to the deflecting means of said display tube.

7. Apparatus in accordance with claim 6 wherein said shield is a diaphragm apertured in accordance with the equation $$d=c\left(1-\sqrt{1-\left(\frac{t_0}{t}\right)^2}\right)$$

where $d$=the width of said aperture in the direction of the cosine function deflection at any position in the direction of the sine function deflection corresponding to the value of $Kt$.

8. Apparatus in accordance with claim 6 wherein said shield comprises light permeable material of varying opacity, said opacity being graduated in the direction of the sine function deflection in accordance with variations of the velocity of seismic waves at proportionally varying distances below the surface of the earth.

9. Apparatus in accordance with claim 6 including means for modulating said electric waves as applied to the deflecting means of said auxiliary tube in accordance with the output of said photocell.

10. Apparatus in accordance with claim 6 including means for modulating said electric waves as applied to the deflecting means of said auxiliary tube in accordance with the output of said photocell and wherein said shield comprises light permeable material of varying opacity, said opacity being graduated in the direction of the sine function deflection in accordance with variations of the velocity of seismic waves at proportional distances below the surface of the earth.

11. Apparatus in accordance with claim 6 wherein said shield comprises a light permeable strip the opacity whereof varies in one dimension proportionally to the distance from the edge of said strip.

12. Apparatus in accordance with claim 11 wherein said screen comprises a plurality of superposable strips.

LU GARDA RIEBER,
*Executrix Under the Last Will and Testament of Frank Rieber, Deceased.*

REFERENCES CITED

The following references are of record in the file of this patent:

UNITED STATES PATENTS

| Number | Name | Date |
|---|---|---|
| 2,096,985 | Von Ardenne | Oct. 26, 1937 |
| 2,144,337 | Koch | Jan. 17, 1939 |
| 2,149,487 | Zilberman et al. | Mar. 7, 1939 |
| 2,183,717 | Keall | Dec. 19, 1939 |
| 2,199,066 | Bernstein | Apr. 30, 1940 |
| 2,251,525 | Rosenthal | Aug. 5, 1941 |
| 2,269,226 | Rohats | Jan. 6, 1942 |
| 2,398,552 | Norton | Apr. 16, 1946 |
| 2,402,058 | Loughren | June 11, 1946 |
| 2,412,670 | Epstein | Dec. 17, 1946 |
| 2,455,532 | Sunstein | Dec. 7, 1948 |
| 2,462,293 | Haynes | Feb. 22, 1949 |
| 2,474,380 | Simmon | June 28, 1949 |